United States Patent
Weiss

(10) Patent No.: US 6,728,422 B1
(45) Date of Patent: Apr. 27, 2004

(54) METHOD AND APPARATUS FOR PRODUCING A 3-D IMAGE FROM A 2-D IMAGE

(75) Inventor: Armin Weiss, Hamburg (DE)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/572,718

(22) Filed: May 16, 2000

(30) Foreign Application Priority Data

May 19, 1999 (DE) .......................... 199 22 975

(51) Int. Cl.[7] .................................. G06K 9/36
(52) U.S. Cl. .................. 382/285; 345/419; 348/578
(58) Field of Search .................. 382/285, 276, 382/277, 286, 289, 307, 131, 291; 345/418, 419, 427, 428, 423, 420; 348/578, 581

(56) References Cited

U.S. PATENT DOCUMENTS

| | | | | |
|---|---|---|---|---|
| 4,710,876 A | * | 12/1987 | Cline et al. ................. | 345/423 |
| 4,831,528 A | * | 5/1989 | Crawford et al. ........... | 382/131 |
| 5,920,319 A | * | 7/1999 | Vining et al. ............... | 345/420 |
| 5,990,897 A | * | 11/1999 | Hanratty ..................... | 345/420 |
| 6,246,805 B1 | * | 6/2001 | Sanjeev et al. ............. | 382/285 |

FOREIGN PATENT DOCUMENTS

WO WO 99 13433 A 3/1999

OTHER PUBLICATIONS

W. Robertz & Donald P. Greenberg, "A Graphical Input System for Computer–Aided Desgin," *CAD 80, Proceedings of 4th Int. Conf. and Exhibition on Computers in Design Eng.*, pp. 715–723, Mar. 1980.

F.D. Coburn & P. McCormick, *CorelDraw 9:The Official Guide*, Chapters 12 and 18, Osborne/McGraw Hill, Berkeley, CA, 1999.

J. Wood, et al., "Visualization Over the World Wide Web and Its Application to Environmental Data," *Proceedings of the Visualization Conference, IEEE/ACM*, pp. 81–86, Oct. 27, 1996.

"CorelDraw 9 runder statt breiter," www. hise.de/newsticker, Mar. 3, 1999.

* cited by examiner

*Primary Examiner*—Jayanti K. Patel
*Assistant Examiner*—Seyed Azarian
(74) *Attorney, Agent, or Firm*—Gunnison, McKay & Hodgson, L.L.P.; Forrest Gunnison

(57) ABSTRACT

A two-dimensional image contains a number of objects, which are represented in layers from front to rear, perpendicularly with respect to the two-dimensional image plane. Each object is defined by a polygon, which encloses a distinguishably represented area of the two-dimensional image. A method orders polygons in a plurality of polygons of a two-dimensional image in a sequence defined by layering of the polygons in the two-dimensional image. A first polygon in the sequence is a reference polygon. The method sequentially assigns each polygon in the sequence, starting with the reference polygon, to one of a plurality of layers so that within a given layer no polygon assigned to the given layer (i) overlaps with another polygon in the given layer, and (ii) is included within another polygon in the given layer. After the assignment to the layer, the method extrudes the polygons of each layer to form a three-dimensional representation having a maximum depth in a direction out of a plane of the two-dimensional image, with each polygon in a reference layer having a minimum depth and polygons in layers other than the reference layer having a depth greater than the minimum depth and less than or equal to the maximum depth.

15 Claims, 7 Drawing Sheets

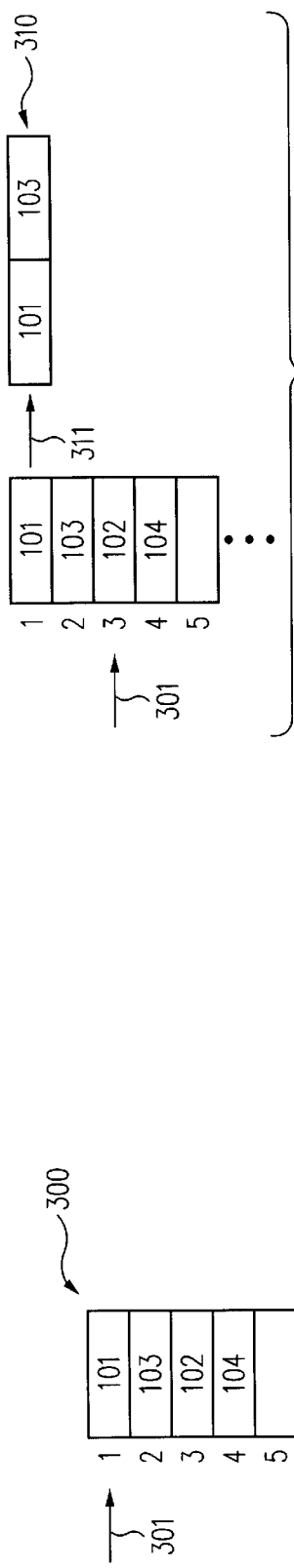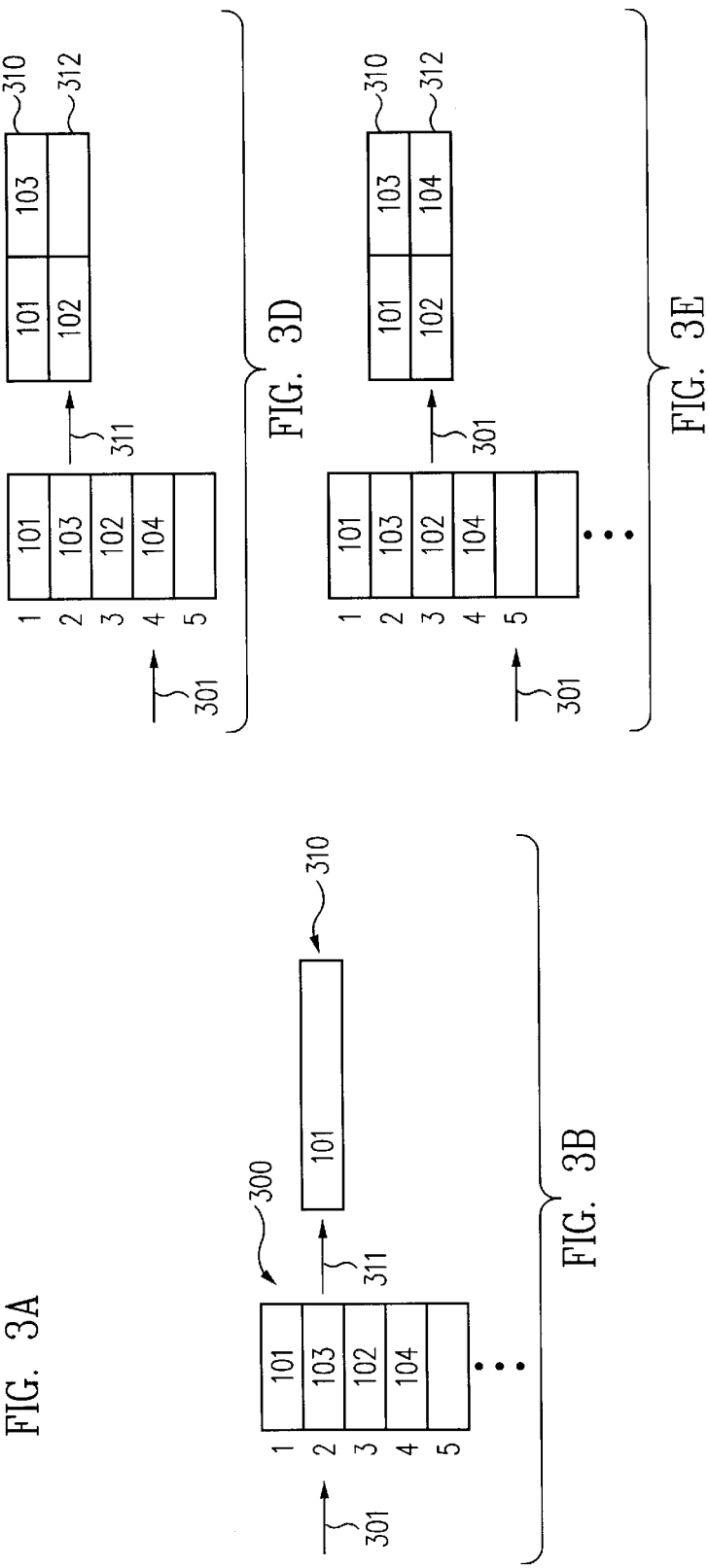
FIG. 3A
FIG. 3B
FIG. 3C
FIG. 3D
FIG. 3E

METHOD AND APPARATUS FOR PRODUCING A 3-D IMAGE FROM A 2-D IMAGE

BACKGROUND OF THE INVENTION

1. Field of the Invention

The invention relates generally to computer generated three-dimensional images, and in particular to a method and an apparatus for producing a three-dimensional image from a two-dimensional image.

2. Description of Related Art

As used herein, the term image generally refers to two-dimensional arrangements of objects from any desired sources and of any desired content, that is in particular photographic or synthetic images and also two-dimensional areas, which represent distributions of measured values or other variables. Also, herein two-dimensional images contain objects defined by polygons (outline edges) and by patterns, color and/or shading of the areas. The objects may partially overlap such that the objects are only partly visible to the viewer.

Computer-based methods for converting a two-dimensional image to a three-dimensional image are known. For example, such a method is used in image processing systems.

The general problem is to create a solid-looking simulation of the third dimension, that is the direction of the axis perpendicular to the two-dimensional image plane, referred to as the z-direction or depth, from the viewer's perspective. Typically, an edge extrusion method is used to produce a three-dimensional image from a two-dimensional image. In this method, the individual polygon edges of the two-dimensional objects are extended, that is, are shifted parallel such that the polygon edges are widened by a certain amount. This method works without any problem in the case of objects, which are represented apart from one another in the two-dimensional image, i.e., do not overlap or enclose one another.

If, however, the two-dimensional image contains objects, which do overlap one another and so partly obscure one another because of their arrangement and their varying distances with respect to the viewer, the known methods have the problem that the two-dimensional objects are assigned the same depth in the three-dimensional representation. This results in depth representations, which do not coincide with the visual impression of the depth arrangement of the objects from the two-dimensional image. Hence, a better method is needed to generating a three-dimensional image from a two-dimensional image.

SUMMARY OF THE INVENTION

According to the principles of this invention, a method for producing a three-dimensional representation from a two-dimensional image allows a better representation of the spatial depth of objects than the prior art methods. A two-dimensional image contains a number of objects, which are represented in layers from front to rear, perpendicularly with respect to the two-dimensional image plane. Each object is defined by a polygon, which encloses a distinguishably represented area of the two-dimensional image.

The method of this invention orders polygons in a plurality of polygons of a two-dimensional image in a sequence defined by layering of the polygons in the two-dimensional image. A first polygon in the sequence is a reference polygon.

The method sequentially assigns each polygon in the sequence, starting with the reference polygon, to one of a plurality of layers so that within a given layer no polygon assigned to the given layer (i) overlaps with another polygon in the given layer, and (ii) is included within another polygon in the given layer. After the assignment to the layer, the method extrudes the polygons of each layer to form a three-dimensional representation having a maximum depth in a direction out of a plane of the two-dimensional image, with each polygon in a reference layer having a minimum depth and polygons in layers other than the reference layer having a depth greater than the minimum depth and less than or equal to the maximum depth.

The method according to the invention is associated with a series of advantages: the ordering of the polygons in layers according to their depth, that is the taking over of the depth information implicitly present in the two-dimensional image, with a polygon handled later being assigned to the layer of the polygon previously considered if there is no overlap but assigned to a new layer if there is an overlap with the polygon previously considered, or inclusion, has the effect of producing a better impression of the depth in the three-dimensional representation while at the same time minimizing the layers required. This creates advantages with regard to the running time for the method, since the complexity of the method merely increases linearly with the number of objects. Moreover, a representation with a natural look is achieved. The provision of values for the minimum depth and the maximum depth of the three-dimensional image serves to ensure a good visual impression for the viewer.

In one embodiment, the invention includes a system having a processor and a memory storing a method for producing a three-dimensional image from a two-dimensional image including objects represented by a plurality of polygons, wherein upon execution of the method on the processor, the method comprises:

ordering polygons in the plurality of polygons in a sequence defined by layering of the polygons in the two-dimensional image wherein a first polygon in the sequence is a reference polygon;

sequentially assigning each polygon in the sequence, starting with the reference polygon, to one of a plurality of layers so that within a given layer no polygon assigned to the given layer (i) overlaps with another polygon in the given layer, and (ii) is included within another polygon in the given layer; and extruding the polygons of each layer to form a three-dimensional representation having a maximum depth out of a plane of the two-dimensional image with each polygon in a reference layer having a minimum depth and polygons in layers other than the reference layer having a depth greater than the minimum depth and less than or equal to the maximum depth.

The system can be, for example, a client-server system, or alternatively, the processor and the memory are in a first device, and a display unit is a part of a second device where the second device is different from the first device, and further the display unit displays the three-dimensional representation.

According to the principles of this invention, a memory having a method for producing a three-dimensional image from a two-dimensional image including objects represented by a plurality of polygons stored therein, wherein upon execution of the method, the method comprises:

ordering polygons in the plurality of polygons in a sequence defined by layering of the polygons in the two-dimensional image wherein a first polygon in the sequence is a reference polygon;

sequentially assigning each polygon in the sequence, starting with the reference polygon, to one of a plurality of layers so that within a given layer no polygon assigned to the given layer (i) overlaps with another polygon in the given layer, and (ii) is included within another polygon in the given layer; and extruding the polygons of each layer to form a three-dimensional representation having a maximum depth out of a plane of the two-dimensional image with each polygon in a reference layer having a minimum depth and polygons in layers other than the reference layer having a depth greater than the minimum depth and less than or equal to the maximum depth In one embodiment, the method is, transferred from the memory to another memory. In one case, this transfer is a download over a communications network.

In still another embodiment, a computer system includes:

means for ordering polygons in the plurality of polygons in a sequence defined by layering of the polygons in the two-dimensional image wherein a first polygon in the sequence is a reference polygon;

means for sequentially assigning each polygon in the sequence, starting with the reference polygon, to one of a plurality of layers so that within a given layer no polygon assigned to the given layer (i) overlaps with another polygon in the given layer, and (ii) is included within another polygon in the given layer; and means for extruding the polygons of each layer to form a three-dimensional representation having a maximum depth out of a plane of the two-dimensional image with each polygon in a reference layer having a minimum depth and polygons in layers other than-the reference layer having a depth greater than the minimum depth and less than or equal to the maximum depth.

BRIEF DESCRIPTION OF THE DRAWINGS

FIGS. 3A to 3E show an ordered sequence of the polygons of FIG. 1A and an assignment of the polygons to layers according to the method of FIG. 2.

Herein, elements with the same reference numeral are the same element.

DETAILED DESCRIPTION

Figure 1A:
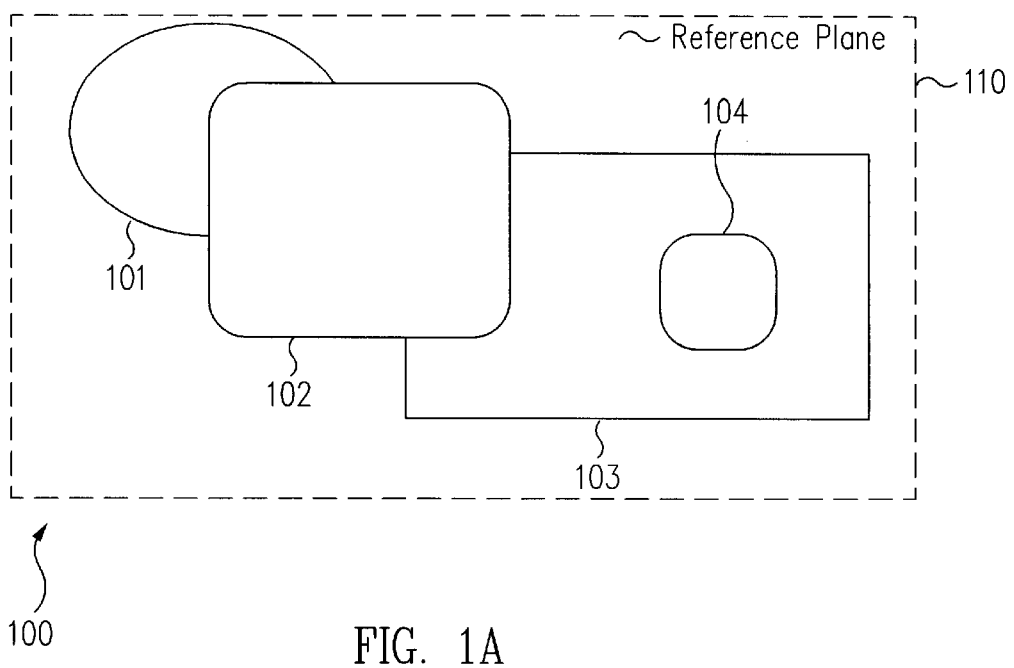
FIG. 1A shows an example of a two-dimensional image comprising a plurality of polygons with a reference plane to define a reference polygon according to the principles of this invention.
Figure 1B:
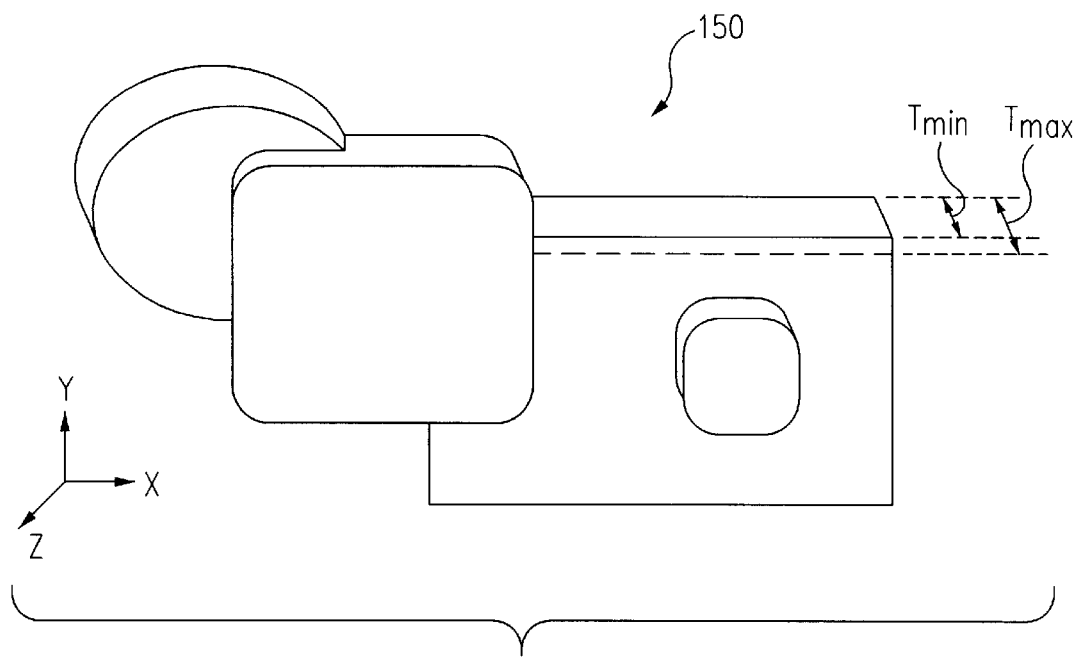
FIG. 1B shows a three-dimensional representation of the two-dimensional image of FIG. 1A according to one embodiment of this invention.

According to the principles of this invention, information in a two-dimensional image 100 (FIG. 1A), i.e., the depth information as represented by the overlap of objects 101 to 104 that make up two-dimensional image 100, is used to generate a realistic three-dimensional representation 150 of two-dimensional image 100, which is referred to herein as a three-dimensional image 150 (FIG. 1B). In particular, the layering of objects 101 to 104 in two-dimensional image 100 is used to assign each two-dimensional object to one of a plurality of layers.

Each two-dimensional object in a given layer in the plurality of layers is extruded to have a defined thickness in a third dimension, e.g., the z direction in FIG. 1B, that is out of the plane defined by the two-dimensional object, e.g., the x-y plane in FIG. 1B, so that all two-dimensional objects assigned to the same layer have the same thickness in the third dimension. The thickness of a particular layer, as explained more completely below, is determined by the relative location of the layer in the three-dimensional representation to the location of the other layers in the plurality of layers, and is selected to provide a three-dimensional representation with a natural look. Moreover, parts of polygons, which are obscured in the two-dimensional image, are also obscured in the three-dimensional representation.

In one embodiment, the three-dimensional objects produced on the basis of the two-dimensional objects lying further back, as defined by the layering, are extruded to be narrower, while on the other hand those lying further forward are correspondingly extruded to be wider. Hence, according to the principles of this invention, the inherent depth sorting present in two-dimensional image 100 is used to generate a realistic three-dimensional representation.

While simple two-dimensional polygons are used to define the two-dimensional objects in FIGS. 1A and 1B, the invention is not limited to such definitions. The two-dimensional objects can be defined based upon patterns, color and/or shading of areas in the two-dimensional image.

In general, each object in a two-dimensional image is defined by a polygon, which encloses a distinguishably represented area of the object. The representation of objects in a two-dimensional image by polygons is well known and so is not considered further. Moreover, the use of a specific set of polygonal objects to demonstrate the principles of this invention is illustrative only, and is not intended to limit the invention to the specific set used.

Figure 2:
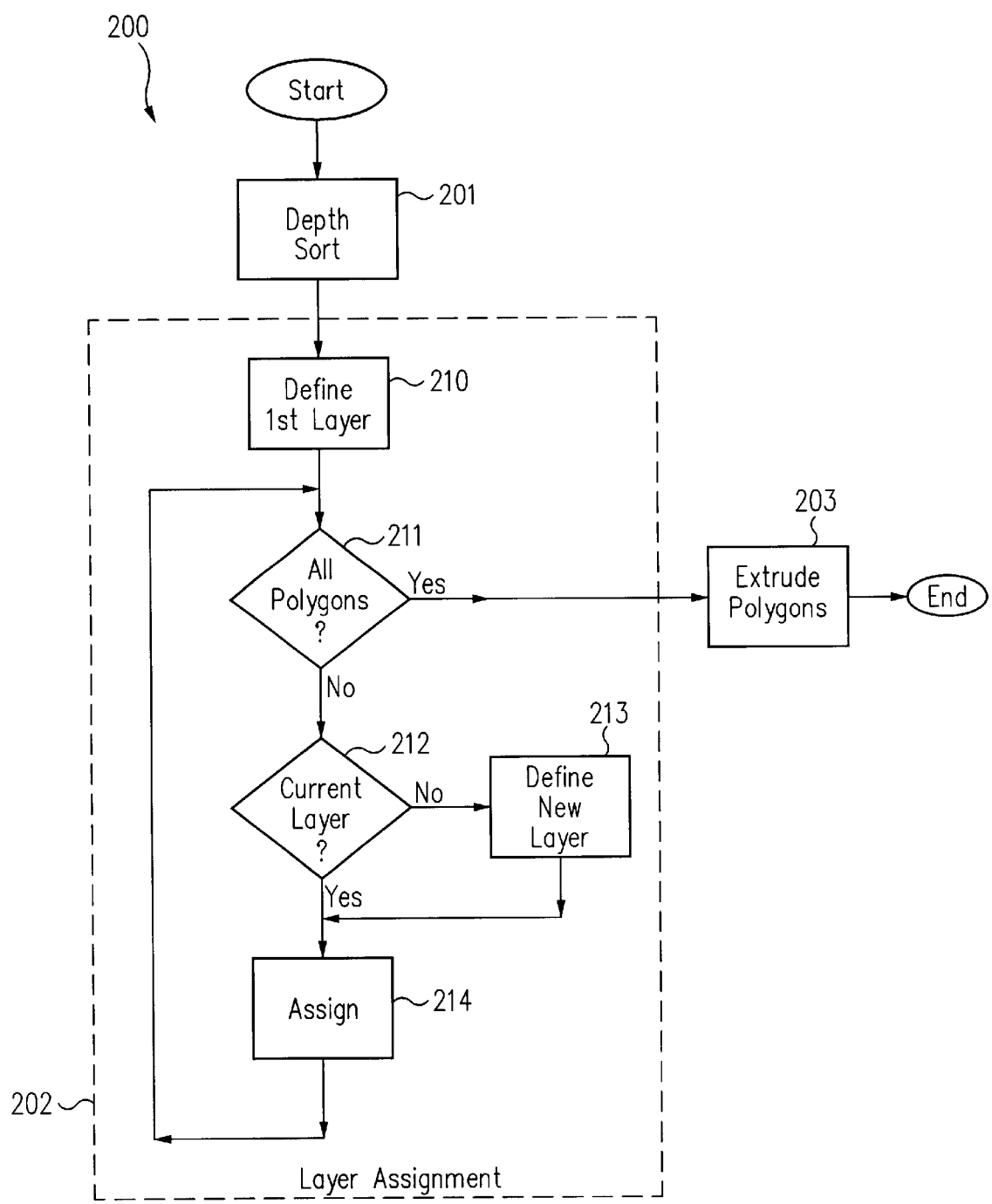
FIG. 2 is a process flow diagram for one embodiment of this invention.

Method 200 (FIG. 2) of this invention includes a depth sorting operation 201. In depth sorting operation 201, polygons in the two-dimensional image are ordered according to the sequence of their layering in the two-dimensional image with respect to a reference polygon, which in the embodiment of FIG. 1A is defined by a reference plane. Hence, depth sorting operation 201 generates a sequence of polygon defined by layering of polygons in the two-dimensional image where a first polygon in the sequence is the reference polygon. Upon completion, depth sorting operation 201 transfers processing to layer assignment operation 202.

Layer assignment operation 202 sequentially assigns each polygon in the sequence, starting with the reference polygon, to one of a plurality of layers so that within a given layer no polygon assigned to the given layer (i) overlaps with another polygon in the given layer, and (ii) is included within another polygon in the given layer. Upon completion, layer assignment operation transfers processing to extrude polygons operation 203.

Extrude polygons operation 203 extrudes the polygons of each layer to form a three-dimensional representation having a maximum depth with each polygon in a reference layer having a minimum depth and polygons in layers other than the reference layer having a depth greater than the minimum depth and less than or equal to the maximum depth. In general, any other polygons in the reference layer are extruded with a minimum depth Tmin. Any polygons in layers behind the reference layer are extruded to be wider as are polygons in layers in front of the reference layer. (Here, behind the reference layer means more removed from the viewer in the three-dimensional image than the reference layer, while in front of the reference layer means closer to the viewer in the three-dimensional image than the reference layer.) Thus, minimum depth Tmin is maintained for each three-dimensional object.

Method 200 is considered in further detail using image 100, as an example. In particular, depth sorting operation 201 of this invention is demonstrated with respect to FIG. 1A, which is an example of a two-dimensional image 100 including four polygons 101, 102, 103, and 104. Polygon 102 overlaps polygons 101 and 103, while polygon 104 overlaps polygon 103, and actually is included within the boundary of polygon 103. (Reference plane 110 is not a part of two-dimensional image 100) This overlapping is implicit in FIG. 1A.

Figure 1C:
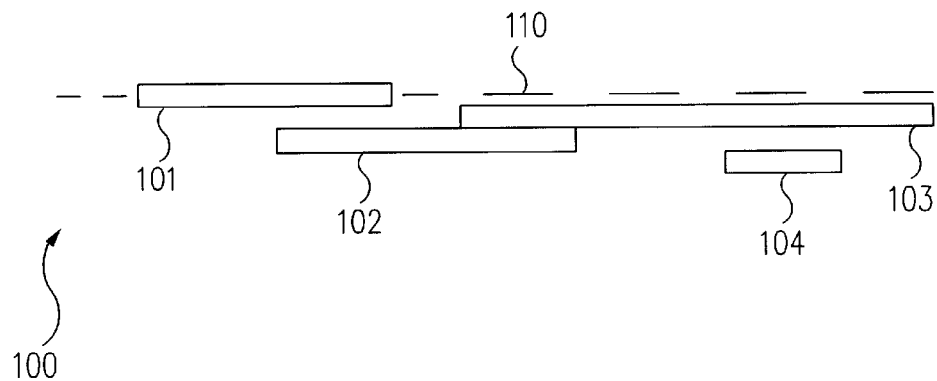
FIG. 1C shows a top view of the two-dimensional image of FIG. 1A.

For purposes of illustration only, FIG. 1C is presented, which is a top view of objects 101 to 104 as presented in FIG. 1A. FIG. 1C shows that object 101 is deepest, e.g., furthest removed from the front surface as viewed in FIG. 1A, followed by objects 103, 102, and 104 respectively. (This information, i.e., the actual relative depth, is not required, but is used to show the principles of the invention more clearly.)

In this embodiment, in depth sorting operation 201, polygons in two-dimensional image 100 are ordered according to the sequence of their layering in two-dimensional image 100 with respect to a reference plane 110 that defines the reference polygon. In the example of FIGS. 1A and 1C, reference plane 110 is at the rear of image 100. Accordingly, the rearmost polygon 101 in two-dimensional image 100 is assigned first place in the order, i.e., is the reference polygon, polygon 103 second place, polygon 102 third place, and front most polygon 104 in two-dimensional image 100 is assigned-last place in the order. Thus, depth sorting operation 201 generates an ordered list 300 of polygons in image 100, i.e., an ordered sequence of polygons.

In FIG. 3A, the reference numerals for the polygons are illustrated in ordered list 300. This is illustrative only as is the use of an ordered list. Methods for storing and/or representing ordered data in a sequence are well known, as are methods for representing polygons in a computer memory, and determining whether polygons in a two-dimensional image overlap. The particular methods used to represent the ordered data and the two-dimensional polygons are not essential to this invention.

The important aspect in depth sorting operation 201 is to select one polygon to define an initial reference and then ordering the other polygons with respect to that reference polygon based upon the overlap. In this example, reference plane 100 is simply one way to define the initial reference for the depth layering that aids in the visualization of the invention. Depth layering operation 201 transfers processing to layer assignment operation 202.

Prior to considering the application of operation 202 to image 100, operations within layer assignment operation 202 are considered in general. Define first layer operation 210 in operation 202 defines a first layer in the three-dimensional image and assigns the first polygon in the ordered list, i.e., ordered sequence, of polygons to the first layer, i.e., to a reference layer. A current polygon pointer is advanced to the second polygon in the ordered list of polygons. Also, a current layer pointer is set to the first layer. As used herein, the current layer refers to the layer addressed by the current layer pointer. Define first layer operation 210 transfers processing to all polygons processed check operation 211.

All polygons processed check operation 211 determines whether all the polygons in the ordered list have been processed in layer assignment operation 202. If one or more polygons remain to be processed, check operation 211 transfers to current layer check operation 212 and otherwise to extrude polygons operation 203.

Current layer check operation 212 determines whether the current polygon, i.e., the polygon in the ordered list of polygons addressed by the current polygon pointer, overlaps any polygons in the two-dimensional image that are assigned to the current layer. As used herein, overlap can be either a partial overlap, or a total overlap where one polygon lies completely in front of another polygon. However, to remove any ambiguity, a complete enclosing of a polygon, called an inclusion, is considered.

If there is no overlap or inclusion in the two-dimensional image between the current polygon and any polygons in the two-dimensional image that are assigned to the current layer, check operation 212 transfers to assign operation 214 and otherwise to define new layer operation 213.

Hence, upon entry to define new layer operation 213, check operation 212 determined that the current polygon overlaps a polygon in the current layer. Consequently, define new layer operation 213 generates a new layer, and changes the current layer pointer to address the new layer so that the new layer becomes the current layer. Operation 213 also transfers to assign operation 214.

Assign operation 214 assigns the current polygon to the current layer, and advances the current polygon pointer to the next polygon in the ordered list of polygons. Assign operation 214 transfers to all polygons processed check operation 211.

Operations 211, 212, 213 and 214 are repeated until all polygons in the ordered list of polygons are assigned to a layer and so layer assignment operation 202 is complete. Layer assignment operation 202 transfers processing to extrude polygons operation 203 in which the polygons are extruded and a resulting three-dimensional image is displayed on a display unit of a device. As explained more completely below, the display unit can be a part of the same device that executes method 200, or alternatively, the display unit can be part of a device that is different from the device that executes method 200.

Returning to image 100, as an example, and considering layer assignment operation 202 with respect to image 100, define first layer operation 210 assigns polygon 101, which is stored in a location in ordered listed 300 that is addressed by current polygon pointer 301, to first layer 310. This operation is illustrated in FIG. 3B as storing reference numeral 101 in a location in memory for first layer 310. Operation 210 advances current polygon pointer 301 to address the next location in ordered list 300, which in this example is location two that stores polygon reference numeral 103. Operation 210 transfers to operation 211.

In operation 211, current polygon pointer 301 identifies a valid polygon and so operation 211 transfers to current layer check operation 212. Methods for determining whether one polygon overlaps or is included within another are known to those of skill in the art, and the particular method for determining overlap and/or inclusion is not essential to this invention. As shown in FIG. 1A, polygon 103 does not overlap polygon 101, which is the only polygon assigned to first layer 310 at this time. Therefore, polygon 103 is considered in first layer 310, according to the principles of this invention, and processing transfers to assign operation 214.

Assign operation 214 assigns polygon 103 to layer 310, which is addressed by current layer pointer 311. Assign operation 214.advances current polygon pointer 301 to address the next location in ordered list 300, which in this example is location three that stores polygon reference numeral 102. Operation 214 transfers to operation 211.

In operation 211, current polygon pointer 301 identifies a valid polygon 102 and so operation 211 transfers to object in current layer check operation 212. As shown in FIG. 1A, polygon 102 overlaps polygons 101 and 103, which are assigned to first layer 310 at this time. Therefore, polygon 103 is not in first layer 310, according to the principles of this invention, and processing transfers to define new layer operation 213.

Define new layer operation 213 generates a new layer 312, and changes current layer pointer 311 to address new layer 312 so that layer 312 becomes the current layer. Operation 213 also transfers to assign operation 214.

Assign operation 214 assigns polygon 103 to layer 312, which is addressed by current layer pointer 311. Assign operation 214 advances current polygon pointer 301 to address the next location in ordered list 300, which in this example is location four that stores polygon reference numeral 104. Operation 214 transfers to operation 211.

In operation 211, current polygon pointer 301 identifies a valid polygon 104 and so operation 211 transfers to object in current layer check operation 212. As shown in FIG. 1A, polygon 104 does not overlap polygons 102 which is assigned to current second layer 312. Therefore, polygon 104 is in second layer 312 according to the principles of this invention, and processing transfers to assign operation 214.

Assign operation 214 assigns polygon 104 to layer 312, which is addressed by current layer pointer 311. Assign operation 214 advances current polygon pointer 301 to address the next location in ordered list 300, which in this example is location five that does not store a polygon reference numeral. Operation 214 transfers to operation 211. In operation 211, current polygon pointer 301 does not identify a valid polygon and so operation 211 transfers to extrude polygons operation 203.

Hence, up to this point, method 200 of this invention includes a series of advantages: the ordering of the polygons in layers according to their depth, that is the taking over of the depth information implicitly present in the two-dimensional image, with a polygon handled later being assigned to the layer of the polygon previously considered if there is no overlap or inclusion, but being assigned to a new layer if there is an overlap or inclusion with the polygon previously considered has the effect of producing a better impression of the depth in the three-dimensional representation while at the same time minimizing the number of layers required. This creates advantages with regard to the running time for the method, since the complexity of the method merely increases linearly with the number of objects. Moreover, a representation with a natural look is achieved In extrude polygons operation 203, the polygons of each layer are extruded to form a three-dimensional representation in such a way that, starting from a predetermined maximum depth (Tmax), each polygon is given a minimum depth (Tmin) and the polygons of layers which are formed at times after a reference layer are respectively given in addition a variable depth (Tvar) increasing with this time sequence, the maximum depth (Tmax) being divided in a predetermined ratio between the minimum depth (Tmin) and the maximum variable depth (Tvar max_n) of the layers formed at times after the reference layer.

Hence, according to the principles of this invention, a maximum depth Tmax for the overall three-dimensional image is defined. Maximum depth Tmax is divided in a certain ratio between a minimum depth Tmin and a maximum variable depth Tvar_max_n, described more completely below, where Tmax=Tmin+Tvar_max_n. Specifically, a thickness ratio Tthick is defined as:

$$Tthick = Tmin/Tvar\_max\_n.$$

Values of thickness ratio Tthick in the range of 80 to 20 have been found to be particularly favorable while alternatively values in the range of 40 to 60 or values in the range of 5 to 95 may also be used. In one embodiment, the user selects the desired ratio. The ratio represents a compromise between a minimum variable content to avoid false representations in conjunction with z-buffer methods and a maximum variable content to avoid reducing the overall depth excessively. The values of minimum depth Tmin and maximum variable depth Tvar_max_n may be individually prescribed through a user interface.

Hence, if the three-dimensional image includes four layers, a first layer has thickness Tmin, a fourth layer has thickness Tmax, a second layer has a thickness T2, and a third layer has a thickness T3, where the thickness are such that:

$$Tmin < T2 < T3 < Tmax,$$

where $$T2 = (Tmin + Tvar\_2),$$

$$T3 = (T2 + Tvar\_3),$$

$$Tmax = (T3 + Tvar\_4) = Tmin + Tvar\_max\_n.$$

When multiple layers are extruded in operation 203, it is also visually advantageous for the viewer to allow variable depth Tvar_i to increase in each case linearly or logarithmically with the sequence of the formation of the layers.

Figure 1D:
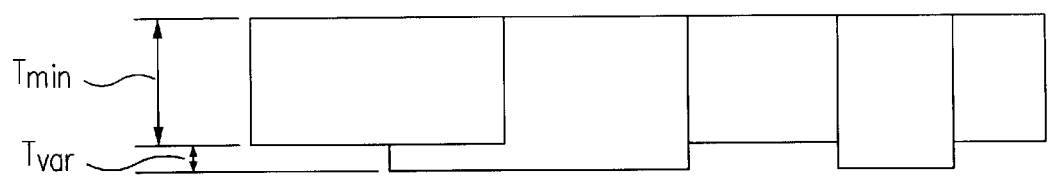
FIG. 1D shows a top view of the three-dimensional image of FIG. 1B.

Returning to two-dimensional image 100, there are only two layers and so polygons 100 and 103 in first layer 310, which is chosen as the reference layer, are given a thickness Tmin, while polygons 102 and 104 in second layer have a thickness of (Tmin+Tvar_2) which is in this case is also (Tmin+Tvar_max_n). See FIG. 1B. FIG. 1B is the three-dimensional image generated as a result of extrude polygons operation 203. FIG. 1D is a top view of the three-dimensional image of FIG. 1B that shows the various thickness dimensions more clearly.

A major advantage of the invention is that the number of layers in the three-dimensional representation is as small as possible. If the method of this invention is utilized but the inherent depth information in the two-dimensional image is not utilized, four layers are necessary if each polygon in FIG. 1A is assigned to a separate layer. Since, however, polygons 102 and 104 do not overlap one another, polygons 102 and 104 can be assigned to the same layer without impairing the impression of depth for the viewer. The method of this invention thus accumulates the two-dimensional depth sorting with the "real" two-dimensional overlapping of the individual polygons.

In view of this disclosure, various alternative embodiments are possible. For example, instead of starting the extrusion with the layer containing the reference polygon in extrude polygons operation 203, another of the layers is selected as the reference layer in operation 203. In this embodiment, polygons of layers, which are extruded at times before the reference layer, are in each case given a variable depth (Tvar) increasing counter to the sequence of their formation. In this case, a three-dimensional representation, which is extruded forwards, and rearwards is obtained, in each case with the reference layer as a mirror axis. It is also advantageous that the middle layer in the sequence be chosen as the mirror axis. In particular, when this is the case, the three-dimensional representation can also be represented turned through 180 degrees, objects of the rearmost plane then being represented as front most objects.

In an extrusion of the objects forwards and rearwards with respect to the viewer, a varying maximum depth (Tmax) can also be chosen, that is a first maximum depth $Tmax\_n$ for the rearward extrusion, and a second maximum $Tmax\_v$ for the forward extrusion. The above description correspondingly applys separately to the two maximum depths $Tmax\_n$ and $Tmax\_v$. These values can advantageously be made to match.

Hence, the method according to the invention can be applied not only to the front sides, but also additionally to the rear sides of the objects. Two separate extrusion operations are carried out, to be precise one for the polygons of layers which were formed at times after the reference layer (these are "front" polygons as before), and a further one for the polygons of layers which were formed at times before the reference layer (these are "rear" polygons). This further extrusion operation takes place mirror-invertedly with respect to the first extrusion operation.

In another embodiment, prior to performing depth sort operation 201, groups of polygons, which are joined directly or indirectly to one another in terms of their paths by overlaps or inclusions, can be defined that form a two-dimensional sub image. Method 200 can be respectively applied separately to each of the sub images and the extruded three-dimensional representations can be combined to form a single three-dimensional representation. In this way, objects, which have no direct or indirect overlapping relationship with one another, can be isolated in larger representations.

Also, the extrusion in the above embodiments can be carried out about a line other than the z-axis. For example, the extrusion can be carried out in a direction of 45 degrees to the perpendicular of the 2D image plane, or alternatively 30 degrees or 60 degrees to the perpendicular of the two-dimensional image plane. In each case, the extension is about a line extending from the plane of the two-dimensional image.

Figure 4A:
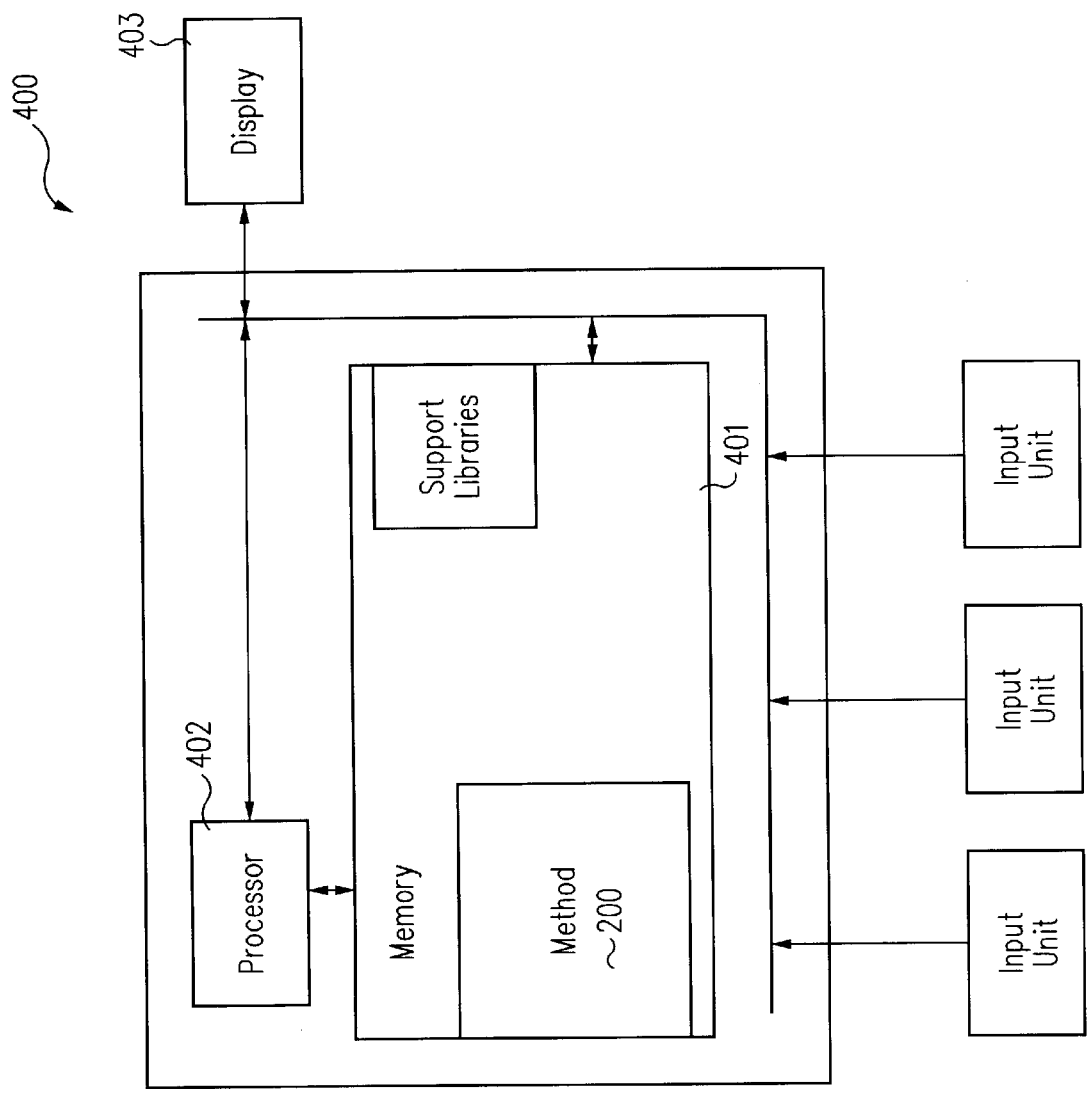
FIG. 4A is a high level block diagram of a system that includes the method of FIG. 2.

In one embodiment, method 200 is stored in a memory 401 (FIG. 4A), either volatile or non-volatile or a combination of the two, and executed from memory 401 by a processor 402. For example, non-volatile memory can include, but is not limited to, any one or more of a hard disk drive, a floppy disk, magnetic tape, flash memory, CD-ROM, or any other suitable memory that once programmed retains the programmed information. As used herein, programmed means storing, information in the memory. Further, those of skill in the art will appreciate that while memory 401 is illustrated as one unit, in most computer systems, memory 401 is implemented as a plurality of memory units. In more general terms, method 200 is stored in a computer readable medium, and when method 200 is loaded from the computer readable medium into a memory of a device, the device is configured to be a special purpose machine that executes method 200.

Either method 200 can call a user interface displayed on display unit 403 so that one or more of the-minimum depth, maximum depth, maximum variable depth, or the thickness ratio can be input by the user, or this data can be obtained via a user interface and stored for subsequent use by method 200.

The particular configuration of the processor 402, memory 401, and display unit 403 are not essential to this invention. The three-dimensional image may also presented on display unit 403, sent to a printer, a facsimile machine, or any other display unit capable of displaying the three-dimensional image generated by method 200.

Also, stored in memory 401 are the various drivers and libraries required for generating a three-dimensional image. The particular routines and drivers used to support method 200 of this invention depend for example on the operating system, computer programming language, and processor used to implement this invention, and are not essential to this invention. In view of this disclosure, those of skill in the art can implement the invention of a wide-variety of physical hardware configurations using an operating system and computer programming language of interest to the user.

Figure 4B:
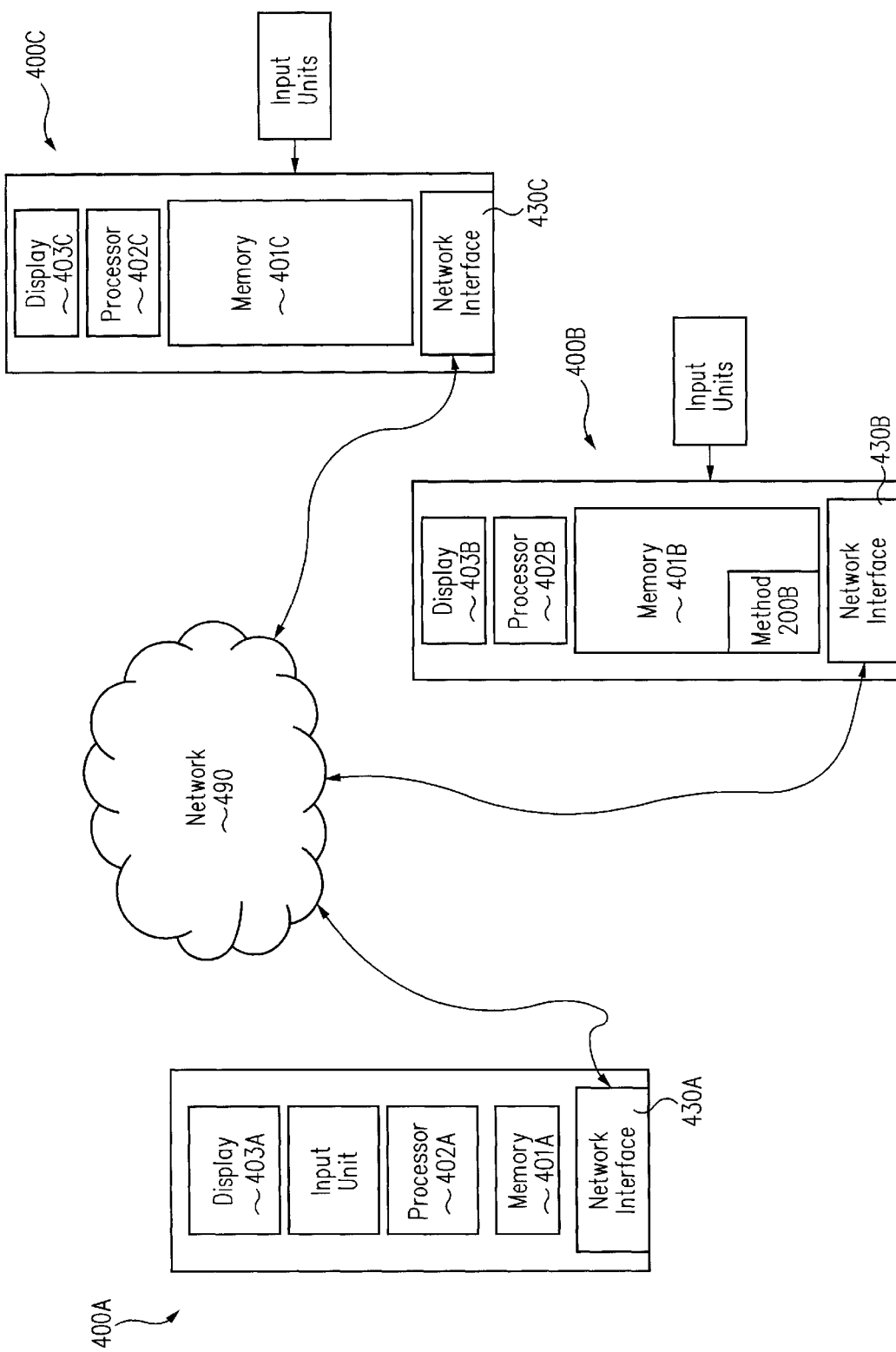
FIG. 4B is a high-level block diagram where the computer system of FIG. 4A is distributed among a plurality of devices that are interconnected via a network.

Computer system 400, in one embodiment, can be a portable computer, a workstation, a two-way pager, a cellular telephone, a digital wireless telephone, a personal digital assistant (PDA), or any other device that includes the components shown and that can execute method 200. Similarly, in another embodiment, computer system 400 can be comprised of multiple different computers, wireless devices, cellular telephones, digital telephones, two-way pagers, or personal digital assistants or any desired combination of these devices that are interconnected to perform method 200 as described herein. See for example, FIG. 4B. Accordingly, a computer memory refers to a volatile memory, a non-volatile memory, or a combination of the two in any one of these devices. Similarly, a computer input unit and a display unit refers to the features providing the required functionality to input the information described herein, and to display the information described herein, respectively, in any one of the aforementioned or equivalent devices.

In addition, memory 401 may be physically located in a location different from processor 402. The only requirement is that processor 402 is coupled to memory 401. This could be accomplished in a client-server system, or alternatively via a connection to another computer via modems and analog lines, or digital interfaces and a digital carrier line. For example, memory 401 could be in a World Wide Web portal 400B (FIG. 4B), while display unit 403 and processor 402 are in personal digital assistant (PDA), or a wireless telephone 400A. Conversely, display unit 403 could be in a client computer 400C, a wireless telephone 400A, or a PDA, while memory 401 and processor 402 are part of a server computer 400B on a wide area network, a local area network, or the Internet.

In view of this disclosure, method 200 can be implemented in a wide variety of computer system configurations. In addition, method 200 could be stored as different modules in memories of different devices. For example, method 200 could initially be stored in a server computer 400B, and than as necessary, a module of method 200 could be transferred to a client device 400A, or 400C and executed on the client device. Consequently, part of method 200 would be executed on the server processor, and another part of method 200 would be executed on the client device.

Figure 4C:
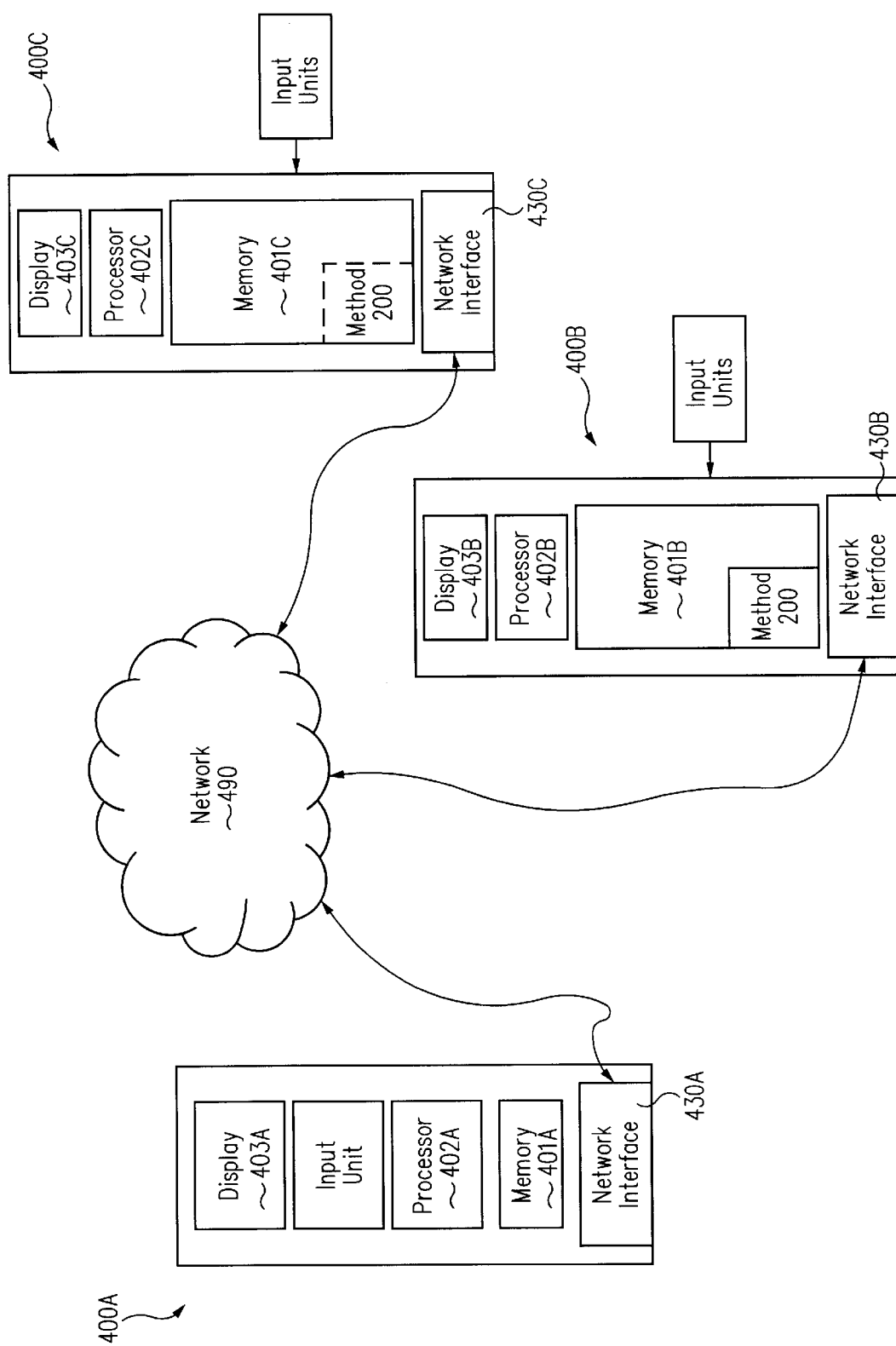
FIG. 4C is a high-level block diagram where the computer system of FIG. 4A is distributed among a plurality of devices, and the method of this invention is transferred from a memory in a first device to a memory in a second device.

In yet another embodiment illustrated in FIG. 4C, method 200 is stored in memory 401B of system 400B. Method 200 is transferred, over network 490 to memory 401C in system 400C. In this embodiment, network interface 430B and 430C can be analog modems, digital modems, or a network interface card. If modems are used, network 490 is a communications network, and process 200 is said to be downloaded.

Thus, the method of this invention can be implemented in a variety of devices, and can be used for a variety of applications by those of skill in the art in view of this disclosure. Accordingly, the embodiments described above are illustrative only and are not intended to limit the invention to the specific configurations described.

I claim:

1. A method for producing a three-dimensional image from a two-dimensional image including objects represented by a plurality of polygons, the method comprising:
    ordering polygons in said plurality of polygons in a sequence defined by layering of said polygons in the two-dimensional image wherein a first polygon in said sequence is a reference polygon;
    sequentially assigning each polygon in said sequence, starting with said reference polygon, to one of a plurality of layers so that within a given layer no polygon assigned to the given layer (i) overlaps with another polygon in the given layer, and (ii) is included within another polygon in the given layer; and
    extruding the polygons of each layer to form a three-dimensional representation having a maximum depth out of a plane of the two-dimensional image with each polygon in a reference layer having a minimum depth and polygons in layers other than said reference layer having a depth greater than said minimum depth and less than or equal to said maximum depth.

2. The method according to claim 1 wherein the reference layer includes the reference polygon.

3. The method according to claim 1 wherein the reference layer is a layer other than the layer containing the reference polygon.

4. The method of claim 1 wherein a maximum variable depth is defined as the difference between the maximum depth and the minimum depth.

5. The method of claim 4 wherein a thickness ratio is the ratio of the minimum depth to the maximum variable depth.

6. The method of claim 5 wherein the thickness ratio is a range of 95 to 5.

7. The method of claim 6 wherein the thickness ratio is in the range of 80 to 20.

8. The method of claim 1 further comprising:
    displaying said three-dimensional representation.

9. A system comprising:
    a processor; and
    a memory storing a method for producing a three-dimensional image from a two-dimensional image including objects represented by a plurality of polygons, wherein upon execution of said method on said processor, the method comprises:
    ordering polygons in said plurality of polygons in a sequence defined by layering of said polygons in the two-dimensional image wherein a first polygon in said sequence is a reference polygon;
    sequentially assigning each polygon in said sequence, starting with said reference polygon, to one of a plurality of layers so that within a given layer no polygon assigned to the given layer (i) overlaps with another polygon in the given layer, and (ii) is included within another polygon in the given layer; and
    extruding the polygons of each layer to form a three-dimensional representation having a maximum depth out of a plane of the two-dimensional image with each polygon in a reference layer having a minimum depth and polygons in layers other than said reference layer having a depth greater than said minimum depth and less than or equal to said maximum depth.

10. The system of claim 9 wherein said system is a client-server system.

11. The system of claim 9 wherein said processor and said memory are in a first device, and a display unit is a part of a second device wherein said second device is different from said first device, and further wherein said display unit displays said three-dimensional representation.

12. A memory having a method for producing a three-dimensional image from a two-dimensional image including objects represented by a plurality of polygons stored therein, wherein upon execution of said method, the method comprises:
    ordering polygons in said plurality of polygons in a sequence defined by layering of said polygons in the two-dimensional image wherein a first polygon in said sequence is a reference polygon;
    sequentially assigning each polygon in said sequence, starting with said reference polygon, to one of a plurality of layers so that within a given layer no polygon assigned to the given layer (i) overlaps with another polygon in the given layer, and (ii) is included within another polygon in the given layer; and
    extruding the polygons of each layer to form a three-dimensional representation having a maximum depth out of a plane of the two-dimensional image with each polygon in a reference layer having a minimum depth and polygons in layers other than said reference layer having a depth greater than said minimum depth and less than or equal to said maximum depth.

13. The memory of claim 12 wherein said method is transferred from said memory to another memory.

14. The memory of claim 13 wherein said transfer comprises a download over a communications network.

15. A computer system comprising:
    means for ordering polygons in a plurality of polygons in a sequence defined by layering of said polygons in a two-dimensional image wherein a first polygon in said sequence is a reference polygon;
    means for sequentially assigning each polygon in said sequence, starting with said reference polygon, to one of a plurality of layers so that within a given layer no polygon assigned to the given layer (i) overlaps with another polygon in the given layer, and (ii) is included within another polygon in the given layer; and
    means for extruding the polygons of each layer to form a three-dimensional representation having a maximum depth out of a plane of the two-dimensional image with each polygon in a reference layer having a minimum depth and polygons in layers other than said reference layer having a depth greater than said minimum depth and less than or equal to said maximum depth.

* * * * *